United States Patent
Dutta (10) Patent No.: US 11,352,508 B2
(45) Date of Patent: Jun. 7, 2022

(54) MOLTEN SALT INHIBITOR AND METHOD FOR CORROSION PROTECTION OF A STEEL COMPONENT

(71) Applicant: Dynalene Inc., Whitehall, PA (US)

(72) Inventor: Sreya Dutta, Macungie, PA (US)

(73) Assignee: DYNALENE INC., Whitehall, PA (US)

( * ) Notice: Subject to any disclaimer, the term of this patent is extended or adjusted under 35 U.S.C. 154(b) by 92 days.

(21) Appl. No.: 16/248,788

(22) Filed: Jan. 16, 2019

(65) Prior Publication Data

US 2019/0225816 A1 Jul. 25, 2019

Related U.S. Application Data (60) Provisional application No. 62/619,133, filed on Jan. 19, 2018.

(51) Int. Cl.
  *C09D 5/08* (2006.01)
  *C09D 1/00* (2006.01)
  (Continued)

(52) U.S. Cl.
  CPC ............ *C09D 5/084* (2013.01); *C01B 15/04* (2013.01); *C01B 15/043* (2013.01);
  (Continued)

(58) Field of Classification Search
  CPC .......... C09D 5/084; C09K 5/12; C23F 11/18; C01B 15/04; C01B 15/043;
  (Continued)

(56) References Cited

U.S. PATENT DOCUMENTS

| 2,248,732 A | * | 7/1941 | Albrecht | C21D 1/607 |
| | | | | 148/631 |
| 4,187,155 A | * | 2/1980 | de Nora | C25C 3/12 |
| | | | | 205/406 |

(Continued)

FOREIGN PATENT DOCUMENTS

WO  WO-2014186286 A1 * 11/2014  ............. C23C 22/68

OTHER PUBLICATIONS

Corrosion of Alloys in a Chloride Molten Salt (NaCl—LiCl) for Solar Thermal Technologies, Solar Energy Materials& Solar Cells, publication date Jun. 1, 2016.*

(Continued)

*Primary Examiner* — Jun Li
(74) *Attorney, Agent, or Firm* — Ashok Tankha (57) ABSTRACT

A method for forming and bonding a corrosion resistant perovskite layer on a surface of a steel component, for example, a stainless steel crucible is disclosed. The method comprises preparing an inhibitor mixture comprising about 0.5% to about 5% by weight of a rare-earth oxide and about 0.1% to about 1% by weight of an oxidizer; preparing a molten chloride salt mixture comprising a predetermined concentration of one of a binary eutectic mixture and a ternary eutectic mixture, mixing the inhibitor mixture to the molten chloride salt mixture to produce an inhibitor salt mixture; applying the inhibitor salt mixture to the surface of the steel component to be bonded with the perovskite layer; and heat treating the steel component with said applied inhibitor salt mixture to a predetermined temperature to form and bond the perovskite layer on said surface of said steel component.

5 Claims, 3 Drawing Sheets

(51) Int. Cl.
*C01B 15/04* (2006.01)
*C01B 15/043* (2006.01)
*C09K 5/12* (2006.01)
*C09K 15/02* (2006.01)

(52) U.S. Cl.
CPC ............ C01B 15/0435 (2013.01); C09D 1/00 (2013.01); C09K 5/12 (2013.01); C09K 15/02 (2013.01); *C04B 2235/3224* (2013.01); *C04B 2235/3227* (2013.01); *C04B 2235/3229* (2013.01)

(58) Field of Classification Search
CPC ........ C01B 15/0435; C04B 2235/3224; C04B 2235/3227; C04B 2235/3229
USPC .......................................................... 252/71
See application file for complete search history.

(56) References Cited

U.S. PATENT DOCUMENTS

| | | | |
|---|---|---|---|
| 4,534,794 A * | 8/1985 | Walter | C09K 5/12 106/14.05 |
| 2003/0039755 A1 * | 2/2003 | Spaldon-Stewart | C23C 18/1241 427/376.1 |
| 2005/0065037 A1 * | 3/2005 | Constien | C09K 8/536 507/203 |
| 2008/0099108 A1 * | 5/2008 | Baudis | C23C 8/56 148/227 |
| 2008/0105553 A1 * | 5/2008 | Nitta | C25D 3/66 205/136 |
| 2012/0225289 A1 * | 9/2012 | Okamura | C08K 5/098 428/341 |
| 2015/0010875 A1 * | 1/2015 | Raade | C09K 5/12 432/9 |
| 2017/0113273 A1 * | 4/2017 | Fang | C22C 14/00 |

OTHER PUBLICATIONS

Machine translation of Bonomi to CH610927A5, publication date May 15, 1979.*

Richard et al., The melting points of the chlorides of lithium, rubidium and caesium and the freezing points of binary and ternary mixtures of these salts, including also potassium and sodium chloride Journal of the American Chemical Society, vol. 39, issues 7-12 , pp. 1816-1828, 1917.*

Wei et al. to "A new ternary chloride eutectic mixture and its thermo-physical properties for solar thermal energy storage" (Energy Procedia 61 (2014) 1314-1317).*

Li et al. to Survey and evaluation of equations for thermophysical properties of binary/ternary eutectic salts from NaCl, KCl, MgCl2, CaCl2, ZnCl2 for heat transfer and thermal storage fluids in CSP (Solar Energy, 152 (2017) 57-79).*

* cited by examiner

MOLTEN SALT INHIBITOR AND METHOD FOR CORROSION PROTECTION OF A STEEL COMPONENT

CROSS-REFERENCE TO RELATED APPLICATIONS

This application claims priority to and the benefit of the provisional patent application titled "Molten Salt Inhibitor and Method For Corrosion Protection Of A Steel Component", application No. 62/619,133, filed in the United States Patent and Trademark Office on Jan. 19, 2018. The specification of the above referenced patent application is incorporated herein by reference in its entirety.

BACKGROUND

Concentrating solar power (CSP) plants typically operate up to 565° C., and use molten alkali nitrates for heat transfer and thermal energy storage systems. Since molten alkali nitrate salts degrade at temperatures above about 565° C., the operating temperature of CSP plants that use molten alkali nitrates for heat transfer is limited to about 550° C. CSP plants also use molten chlorides as heat transfer liquids. Molten chlorides are non-toxic and thermally stable up to about 720° C. Accordingly, use of molten chlorides as heat transfer liquids in CSP plants allow an operating temperature of about 720° C. The primary deterrent in using molten chlorides or chloride heat transfer fluids in CSP plants is the severe corrosion of stainless steel components and stainless steel alloys exposed to molten chloride salts.

While Inconel® alloys of Huntington Alloys Corporation, and Hastelloy® alloys of Haynes International, Inc. are used in molten salt reactors in concentrating solar power (CSP) plant systems, the corrosivity of the molten chloride melt in the heat transfer fluid makes use of these alloys economically infeasible. When stainless steel alloys are used in a molten chloride melt, the high temperature and aggressive nature of the molten chloride melt results in leaching of chromium (Cr) ions from the stainless steel, thereby increasing the acidity of the molten chloride melt and causing formation of chromium chloride ($CrCl_3$) in the molten chloride melt. To minimize corrosion and leaching in CSP plants, Inconel® alloys and Hastelloy® alloys are used in high temperature and corrosive environments instead of stainless steel. Corrosion of stainless steel components in contact with molten chloride salts causes rapid oxidation and spoliation of the protective chromium oxide in the stainless steel. Therefore, there is a need for preventing high temperature corrosion of stainless steel components that come in contact with molten chloride salts.

Various methods, for example, thermal sprays, sol-gel coating formation, in-situ coating formation, etc., are used to prevent high temperature corrosion of stainless steel components. Other industrial coating deposition methods to prevent corrosion, for example, diffusional heat treatment or dipping the stainless steel components in molten baths, etc. are also used.

Hence, there is a long felt need for forming and bonding a corrosion resistant layer to the surface of a steel component to prevent high temperature corrosion and leaching of ions, for example, chromium ions, nickel ions, etc., from stainless steel components used with molten chloride salts, for example, molten chloride salts used in concentrating solar power (CSP) plants.

SUMMARY OF THE INVENTION

A method for forming and bonding a corrosion resistant perovskite layer on a surface of a steel component, for example, a stainless steel crucible, a stainless steel rod, etc., is provided. The method disclosed herein comprises preparing an inhibitor mixture comprising about 0.5% to about 5% b weight of a rare-earth oxide and about 0.1% to about 1% by weight of an oxidizer; preparing a molten chloride salt mixture, comprising a predetermined concentration of a binary eutectic mixture or a ternary eutectic mixture; mixing the inhibitor mixture with the molten chloride salt mixture to produce an inhibitor salt mixture; applying the inhibitor salt mixture to the surface of the steel component on which the perovskite layer is to be bonded; and heat treating the steel component with the applied inhibitor salt mixture to a predetermined temperature to form and bond the perovskite layer on the surface of the steel component.

DETAILED DESCRIPTION OF THE INVENTION

Disclosed herein is a method for forming and bonding a corrosion resistant perovskite layer to the surface of a steel component, hereinafter steel component. The steel component is, for example, a stainless steel crucible, a stainless steel component, etc. made of a stainless steel alloy, for example, a 316 grade stainless steel alloy, a 304 grade stainless steel, a 321 grade stainless steel alloy, a 309 grade stainless steel alloy, a 347H grade stainless steel alloy, etc. The perovskite layer that forms and bonds to the surface of a steel component comprises a layer of $XFeO_3$, where X comprises lanthanum, cerium, gadolinium, and/or dysprosium. An example of a perovskite layer that forms and bonds to the surface of a steel component comprises a layer of lanthanum ferrite, ($LaFeO_3$). In an embodiment, the perovskite layer is crystalline. In another embodiment, the perovskite layer that bonds to the surface of a steel component is a substantially continuous layer.

Figure 1:
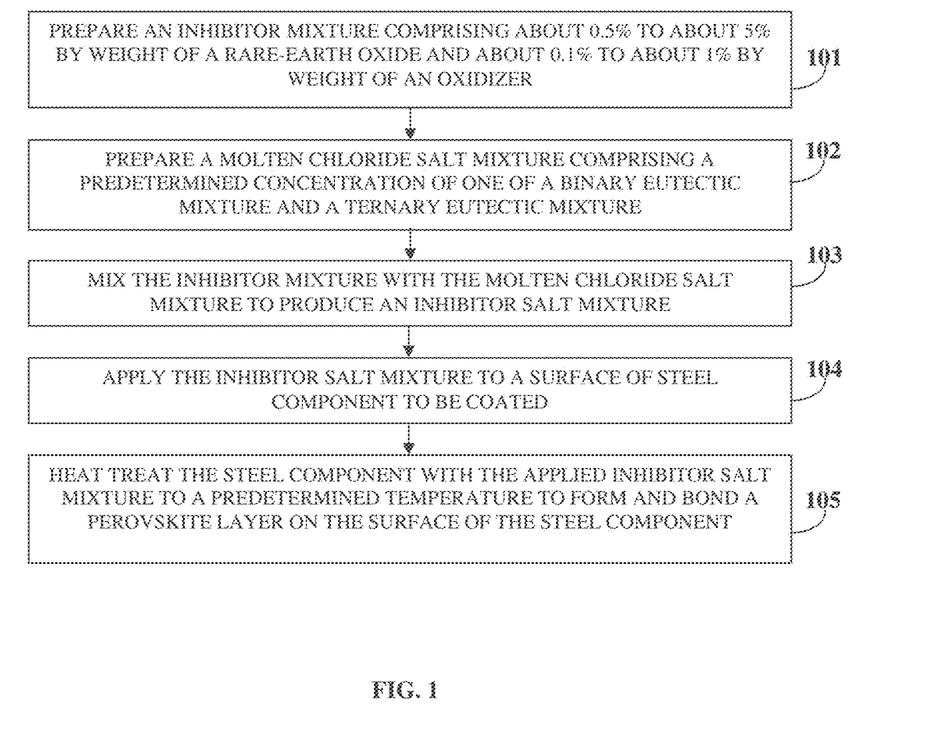
FIG. 1 illustrates a method for producing a corrosion resistant perovskite layer on a surface of a steel component.

FIG. 1 illustrates a method for forming and bonding a corrosion resistant perovskite layer to the surface of a steel component. The method comprises preparing 101 an inhibitor mixture comprising about 0.5% to about 5% by weight of a rare-earth oxide and about 0.1% to about 1% by weight of an oxidizer; preparing 102 a molten chloride salt mixture comprising a predetermined concentration of a binary eutectic mixture or a ternary eutectic mixture; mixing 103 the inhibitor mixture with the molten chloride salt mixture to produce an inhibitor salt mixture; applying 104 the inhibitor salt mixture to the surface of the steel component on which the perovskite layer is to be bonded; and heat treating 105 the steel component with the applied inhibitor salt mixture to a predetermined temperature, for example in a furnace, to form and bond the corrosion resistant perovskite layer to the surface of the steel component. In an embodiment, the steel component is heat treated with the applied inhibitor salt mixture to a predetermined temperature in a temperature range of about 400° C. to about 900° C., for a time period of about 16 hours to about 120 hours. In another embodiment, the steel component with the applied inhibitor salt mixture is heat treated to a predetermined temperature, for example in a furnace purged with a flowing inert gas environment, to form and bond the corrosion resistant perovskite layer to the surface of the steel component.

The rare-earth oxide used in the preparation of the inhibitor mixture comprise oxides of lanthanum, cerium, gadolinium, dysprosium, and any combination thereof. The oxidizer used in the preparation of the inhibitor mixture comprise peroxides of sodium, potassium, magnesium, and/or any combination thereof. The rare-earth oxide increases the basicity of the molten chloride salt mixture. The oxidizer in the inhibitor mixture facilitates the formation of a continuous, corrosion resistant perovskite layer on the surface of the steel component.

As used herein, a binary eutectic mixture is a homogenous mixture of two salt components which melts or freezes at a single temperature lower than the melting/freezing point of the component salts. Also, as used herein, a ternary eutectic mixture is a homogenous mixture of three salt components which melts or freezes at a single temperature lower than the melting/freezing point of the component salts. The binary eutectic mixture and the ternary eutectic mixture in the molten chloride salt mixture comprise chloride salts, for example, lithium chloride (LiCl), potassium chloride (KCl), sodium chloride (NaCl), calcium chloride ($CaCl_2$), etc., and any combination thereof. For example, a binary eutectic molten chloride salt mixture comprises a mixture of LiCl and KCl. Also, as an example, a ternary eutectic molten chloride salt mixture comprises a mixture of LiCl, KCl, and NaCl. Another example of a ternary eutectic molten chloride salt mixture comprises a mixture of LiCl, KCl, and $CaCl_2$. The predetermined concentration of LiCl varies, for example, between about 30% by weight to about 50% by weight of the binary eutectic mixture, and between about 15% by weight to about 35% by weight of the ternary eutectic mixture. The predetermined concentration of KCl varies, for example, between about 40% by weight to about 60% by weight in both the binary and ternary eutectic mixtures. The predetermined concentration of NaCl varies, for example, between about 5% by weight to about 10% by weight in the ternary eutectic mixture. The predetermined concentration of the $CaCl_2$ varies, for example, between about 10% by weight to about 20% by weight in both the binary and ternary eutectic mixtures. The molten chloride salt mixture exhibits a low melting point of, for example, less than 400° C., a high thermal stability, for example, a thermal stability up to about 1400° C., and low vapor pressure. The melting point of the molten chloride salt mixture is, for example, between about 300° C. to about 400° C.

The inhibitor salt mixture is used as a heat transfer fluid and a thermal energy storage medium in concentrating solar power (CSP) plants. Other high temperature applications of the molten chloride salt mixture and the inhibitor salt mixture comprise, for example, a molten salt bath, process heating, etc.

The lithium ion ($Li^+$) in the molten chloride salt mixture facilitates the following functions: the dissolution of lanthanum oxide in the molten chloride salt mixture, bonding of the protective crystalline perovskite $XFeO_3$ layer to the surface of the steel component, and stabilization of the perovskite structure. Addition of the peroxide facilitates the formation of a perovskite, $RFeO_a$ over a chloride $RCl_b$ by increasing the oxygen concentration in the molten chloride salt mixture, where R is the rare-earth oxide, and a and b are the valence phase. The protective crystalline perovskite layer on the surface of the steel component provides corrosion resistance to the surface of the steel component at high operating temperatures and in corrosive environments, for example when the steel component is exposed to chloride salts.

Lanthanum based perovskite crystals in molten chloride salts facilitate nucleation and growth of manganese (Mn), nickel (Ni), and zirconium (Zr) based lanthanum (La) perovskites at temperatures above the melting point of the molten chloride salt mixtures. High treatment of the steel component with the inhibitor salt mixture applied to the surface of the steel component on which the perovskite layer is to be bonded, results in the formation of a faceted perovskite structure bonded to the surface of the steel component; the thickness range of the perovskite layer bonded the surface of the steel component varies between about 1 to about 100 microns. The lower surface of the perovskite layer bonds to the surface of the stainless steel component on which the inhibitor salt mixture is applied, when the steel component is heat treated to provide corrosion resistance to the underlying stainless steel. Disclosed below are examples of the formation and bonding of a corrosion resistant perovskite layer on the surface of a steel component.

Example 1

This example illustrates the formation and bonding of a perovskite layer on the inner surface of a 316 grade stainless steel crucible, hereinafter crucible, where the molten chloride salt mixture applied to the inner surface of the crucible is a binary eutectic mixture. The crucible was provided with a 316 grade stainless steel alloy lid, hereafter lid. Individual molten chloride sails were maintained at a temperature of about 120° C. under a vacuum to keep the salts dry and to prevent clumping. An inhibitor mixture was prepared by mixing about 1 g of lanthanum oxide ($La_2O_3$) and about 0.027 g of sodium peroxide ($Na_2O_2$), rising a mortar and pestle. The molten chloride salt mixture was prepared by weighing, grinding and mixing about 8.45 grams (g) of lithium chloride (LiCl) and about 10.51 g of potassium chloride (KCl), using a mortar and pestle. The inhibitor salt mixture was prepared by mixing and grinding the inhibitor mixture with the molten chloride salt mixture, using a mortar and pestle. The inhibitor salt mixture was poured into the crucible and the crucible was thereafter closed by the lid. The crucible with the enclosed inhibitor salt mixture was heat treated at a temperature of about 750° C. for about 100 hours in a furnace purged with a continuous flow of inert nitrogen gas for the duration of the heat treatment. After completion of the heat treatment, cross-sectional samples of the crucible surface on which the inhibitor salt mixture was applied were cut and embedded in an epoxy. The epoxy mounts were polished and examined under a scanning electron microscope. The surface of the cross-sectional samples showed a continuous, crack-free crystalline perovskite layer comprising lanthanum ferrite ($LaFeO_3$) with a layer thickness that varied from about 10-20 microns. The perovskite layer bonded to the inner surface of the crucible provides corrosion protection to the underlying inner surface of the crucible.

Example 2

This example illustrates the formation and bonding of a perovskite layer on the surface of a 316 grade stainless steel rod with a dimension of about ¼ inch diameter and 24 inches length, hereinafter a steel rod, where the molten chloride salt mixture applied to the surface of the steel rod was a ternary eutectic mixture. An inhibitor mixture was prepared by mixing about 3.37 g of lanthanum oxide ($La_2O_3$) and about 0.54 g of sodium peroxide ($Na_2O_3$), using a mortar and pestle. The molten chloride salt mixture was prepared by weighing, grinding and mixing individually dried salts of about 13.14 grams (g) of lithium chloride (LiCl), about 9.56 g of calcium chloride ($CaCl_2$), and about 33.39 g of potassium chloride (KCl), using a mortar and pestle. The inhibitor salt mixture was prepared by mixing and grinding the inhibitor mixture with the molten chloride salt mixture, using a mortar and pestle. About 60 g of the inhibitor salt mixture was transferred into an alumina tube. The alumina tube with the inhibitor salt mixture was placed inside a tube furnace purged with a continuous flow of inert argon (Ar) for the duration of the heat treatment. When the inhibitor salt mixture was molten, the steel rod was immersed and rotated at about 10 revolutions per minute (rpm) in the molten inhibitor salt mixture during the heat treatment for about 100 hours at a temperature of about 750° C. At the end of the heat treatment, the rotation was stopped before the inhibitor salt mixture reached its freezing temperature during the cool down process.

Figure 2A:
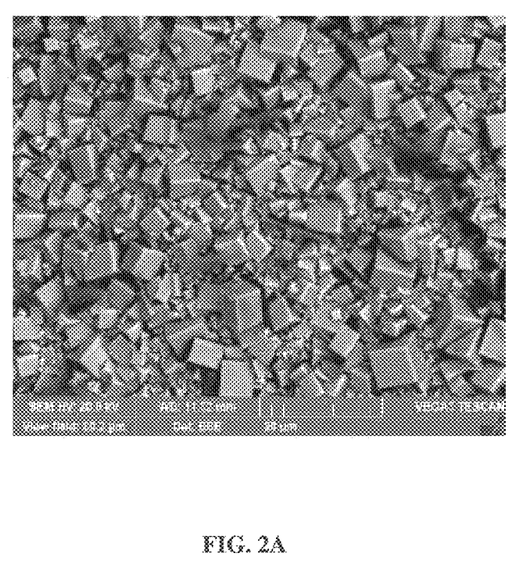
FIG. 2A exemplarily illustrates a high magnification scanning electron microscopy image of perovskite crystals formed on a surface of a steel component after exposure to an inhibitor salt mixture at a predetermined temperature for a period of time.
Figure 2B:
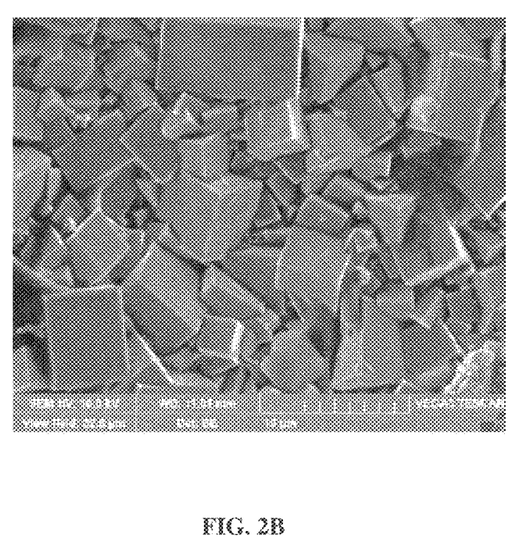
FIG. 2B exemplarily illustrates a low magnification scanning electron microscopy image of perovskite crystals formed on a surface of a steel component after exposure to an inhibitor salt mixture at a predetermined temperature for a predetermined period of time.

The heat treated steel rod was removed from the alumina tube. The residual inhibitor salt mixture was removed from the surface of the heat treated steel rod using water and a plastic brush. The surface of the heat treated steel rod surface was analyzed using scanning electron microscopy (SEM) which produces images of the surface scanned using a focused beam of electrons. The electrons interact with atoms on the surface of the steel rod immersed in the molten inhibitor salt mixture, producing signals that contain information about the surface topography and composition of the surface of the steel rod. A high magnification SEM image of the surface of the part of the steel rod was taken. The SEM image showed a crystalline perovskite layer bonded to the surface of the steel rod as exemplarily illustrated in FIG. 2A. A low magnification SEM image showed a crystalline perovskite layer bonded to the surface of the heat treated steel rod as exemplarily illustrated in FIG. 2B. The surface of the heat treated steel rod was also analyzed using energy dispersive X-ray spectroscopy (EDS). EDS is an analytical technique used for an elemental analysis and chemical characterization of the surface of the steel rod immersed in the molten inhibitor salt mixture and heat treated. EDS detected lanthanum, iron, and oxygen on the crystalline perovskite layer above an underlying chromium oxide layer. An X-ray diffraction technique confirmed that the crystalline layer bonded to the surface of the steel rod was a perovskite layer comprising lanthanum ferrite ($LaFeO_3$) with a layer thickness that varied from about 5-15 microns.

Example 3

This example illustrates the formation and bonding of a perovskite layer on the surface of 316 grade stainless steel coupons with a dimension of about ½ inch by ½ inch by 1/16 inch, each, hereinafter steel coupons, where the molten chloride salt mixture applied to the surface of the steel coupons was a ternary eutectic mixture. An inhibitor mixture was prepared by mixing and grinding about 0.99 g of lanthanum oxide and about 0.03 g of sodium peroxide using a mortar and pestle. The molten chloride salt mixture, a ternary chloride melt, was prepared by grinding and mixing individually dried salts of about 6.99 grams (g) of lithium chloride (LiCl), about 1.97 g of sodium chloride (NaCl), and about 10.03 g of potassium chloride (KCl) using a mortar and pestle. An inhibitor salt mixture was prepared by mixing and grinding the inhibitor mixture with the molten chloride salt mixture, using a mortar and pestle. The inhibitor salt mixture was transferred into an alumina tube provided with a ceramic lid. The alumina tube with the inhibitor salt mixture was placed inside a tube furnace and heated till the inhibitor salt mixture was molten. When the inhibitor salt mixture was molten, the steel coupons were immersed in the molten inhibitor salt mixture, and the alumina tube with the molten inhibitor salt mixture and steel coupons were heat treated at about 750° C. for about 100 hours in the tube furnace purged with a continuous flow of inert argon (Ar) for the duration of the heat treatment.

At the end of the heat treatment, the steel coupons were removed from the salt mixture and any residual salt mixture removed from the surface of the steel coupon. Scanning Electron Microscope (SEM) and Energy Dispersive Spectroscopy (EDS) of the surface of the steel coupons was performed which showed a continuous crystalline perovskite layer comprising lanthanum ferrite ($LaFeO_3$) with a layer thickness that varied from about 10-25 microns, bonded to the surface of the steel coupons. EDS maps confirmed the crystalline layer bonded to the surface of the steel coupons was a perovskite layer comprising lanthanum ferrite ($LaFeO_3$).

Example 4

This example illustrates the formation and bonding of a perovskite layer on 316 grade stainless steel pieces with a dimension of about 1 inch by 1 inch by 1/16 inch, each, hereinafter steel pieces, where the molten chloride salt mixture applied to the surface of the steel pieces was a ternary eutectic mixture. An inhibitor mixture was prepared by mixing and grinding about 0.57 g of lanthanum oxide ($La_2O_3$) and about 0.09 g of sodium peroxide ($Na_2O_2$), using a mortar and pestle. The molten chloride salt mixture, was prepared by grinding and mixing individually dried salts of about 4.55 g lithium chloride (LiCl), 11.51 g of potassium chloride (KCl), and 3.26 g of calcium chloride ($CaCl_2$) salts using a mortar and pestle. An inhibitor salt mixture was prepared by mixing and grinding the inhibitor mixture with the molten chloride salt mixture, using a mortar and pestle. The salt mixture containing the oxides and chloride salts were transferred to a silica crucible, covered with a silica lid and melted at about 355° C. in a furnace. The inhibitor salt mixture was maintained at about 355° C. for about 2 hours and then the inhibitor salt mixture was cooled, crushed and ground to create a homogenous inhibitor salt mixture using a mortar and pestle. The inhibitor salt mixture and two steel pieces were transferred to an alumina crucible, and the alumina crucible covered with a ceramic lid. The crucible with the inhibitor salt mixture and the metal pieces were placed in a furnace purged with a flowing nitrogen gas environment for the duration of the heat treatment, and thermal cycled between 450° C. and 720° C. for about 8 hours at each temperature, for four cycles. The metal pieces were removed from the inhibitor salt mixture and cleaned of residual inhibitor salt mixture with water and a plastic brush.

The surface of the metal pieces were bonded with a crystalline layer. The surface of the metal pieces were analyzed using X-Ray Diffraction (XRD). The major peaks observed in the XRD (greater than 95%) are assigned to the orthorhombic lanthanum ferrite ($LaFeO_3$) phase, an indicia of the perovskite layer bonded to the surface of the metal pieces.

Figure 3:
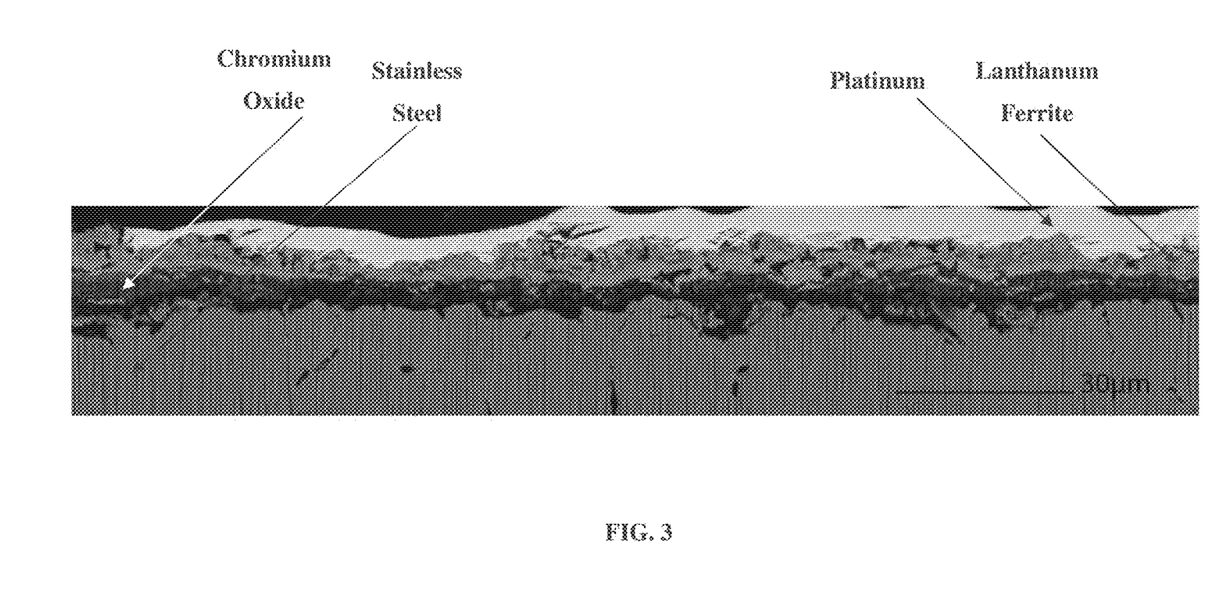
FIG. 3 exemplarily illustrates a scanning electron microscopy (SEM) image of a cross-section of a metal sample showing an adherent lanthanum ferrite crystalline layer above a chromium oxide rich layer with underlying stainless steel grains.

Cross sections of a metal piece subjected to the thermal cycling were prepared using Focused Ion Beam (FIB) technique. A platinum layer is deposited in-situ while preparing the sample using FIB to protect the top surface layers of the metal pieces from being milled away. SEM of the cross-section of the metal pieces shows an adherent lanthanum ferrite crystalline layer bonded to the upper surface of the chromium oxide rich layer with underlying stainless steel grains as shown in FIG. 3. A strong bond between the lanthanum ferrite ($LaFeO_3$) perovskite layer and the underlying chromium oxide layer was observed. Very few voids were noted among the lanthanum ferrite ($LaFeO_3$) perovskite crystals and those present were isolated from the external surface. The perovskite layer comprising lanthanum ferrite ($LaFeO_3$) covered the surface of the steel pieces and was firmly bonded to the surface of the steel pieces. The thickness of the perovskite layer bonded to the surface of the steel pieces varied from about 20-40 microns.

Example 5

This example illustrates the formation and bonding of a perovskite layer on the surface of a 304 grade stainless steel coupons with a dimension of about ½ inch by ½ inch by 1/16 inch, each, hereinafter steel coupon, where the molten chloride salt mixture applied to the surface of the coupon was a binary eutectic mixture. An inhibitor mixture was prepared by mixing and grinding about 1.01 g of lanthanum oxide ($La_2O_3$) and about 0.11 g of sodium peroxide ($Na_2O_2$) using a mortar and pestle. A molten chloride salt mixture, was prepared by grinding and mixing individually dried salts of about 8.45 g of lithium chloride (LiCl), 10.51 g of potassium chloride (KCl) using a mortar and pestle. An inhibitor salt mixture was prepared by mixing and grinding the inhibitor mixture with the molten chloride salt mixture, using a mortar and pestle. The inhibitor salt mixture was placed in a quartz container and heated slightly above the molting point of the inhibitor salt mixture (>355° C.) and held for about 2 hours. The inhibitor salt mixture was then cooled, crushed and ground to create a homogenous inhibitor salt mixture. The steel coupons were placed inside the alumina crucible, the inhibitor salt mixture was added to the crucible, the top of the crucible was closed with the crucible lid, and the crucible was thereafter heated and maintained at about 700° C. for about 200 hours in a furnace purged with a continuous flow of nitrogen for the duration of the heat treatment. After the heat treatment, the steel coupons were removed from the crucible. The residual inhibitor salt mixture was removed from the steel coupons and the steel coupons cleaned using a ultra-sonicator with hot water. The steel coupons were stored under nitrogen in a desiccator for further testing.

The steel coupons were examined under a SEM. The SEM confirmed the formation of a crystalline perovskite layer comprising lanthanum ferrite ($LaFeO_3$) bonded to the surface of the steel coupons. Scanning Electron Microscope (SEM) and Energy Dispersive Spectroscopy (EDS) of the surface of the steel coupons was performed which showed the formation of the crystalline perovskite layer comprising lanthanum ferrite ($LaFeO_3$) on the surface of the steel coupons. The elemental composition of the crystals showed the composition of the crystal comprises lanthanum, oxygen and iron using EDS. EDS maps confirmed the formation of a crystalline perovskite layer comprising lanthanum ferrite ($LaFeO_3$) bonded to the surface of the steel coupons. The thickness of the perovskite layer bonded to the surface of the steel coupons varied from about 10-20 microns.

Example 6

This example illustrates the formation and bonding of a perovskite layer on the inner surface of a 321 grade stainless steel crucible, hereinafter steel crucible, where the molten chloride salt mixture applied to the inner surface of the crucible was a binary eutectic mixture. An inhibitor mixture was prepared by mixing and grinding about 0.58 g of lanthanum oxide ($La_2O_3$) and about 0.09 g of sodium peroxide ($Na_2O_2$) using a mortar and pestle. A molten chloride salt mixture was prepared by grinding and mixing individually dried salts of about 4.55 g of lithium chloride (LiCl), 11.52 g of potassium chloride (KCl) and 3.26 g $CaCl_2$ using a mortar and pestle. An inhibitor salt mixture was prepared by mixing and grinding the inhibitor mixture with the molten chloride salt mixture, using a mortar and pestle. The inhibitor salt mixture was ground and mixed well using a generic salt grinder to form an uniform ternary inhibitor salt mixture. The inhibitor salt mixture was transferred to crucibles provided with a lid also made from 321 grade stainless steel. The lid was closed and the crucible heat treated at about 750° C. for 50 about hours in a furnace purged by an inert argon gas for the duration of the heat treatment. Following the heat treatment, the crucible was cut and cleaned using hot water in an ultra-sonicator. The stainless steel pieces from the crucible were then stored under argon in a desiccator for further analysis.

Metallographic cross-sections of the steel pieces were embedded in epoxy mounts which were polished to about 0.1 micron with colloidal silica. The polishing and grinding steps ensure removal of surface roughness and deformities to provide a surface finish conducive for microscopic analysis. These cross-sections were examined under the SEM and EDS. SEM and EDS showed a continuous, crystalline perovskite layer comprising lanthanum ferrite ($LaFeO_3$) above the chromium oxide layer on the surface of the steel pieces. The perovskite layer covered the surface of the steel pieces and were firmly bonded to the surface of the steel pieces. The thickness of the perovskite layer bonded to the inner surface of the crucible varied from about 5-10 microns.

Example 7

This example illustrates the formation and bonding of a perovskite layer on the surface of a 309 grade stainless steel rod with a dimension of about ¼ inch diameter and 24 inches in length, hereinafter a steel rod, where the molten chloride salt mixture applied to the surface of the steel rod was a binary eutectic mixture. An inhibitor mixture was prepared by mixing and grinding about 3.02 g of lanthanum oxide and about 0.08 g of potassium peroxide in a mortar and pestle. A molten chloride salt mixture, was prepared by grinding and mixing individually dried salts of about 25.36 g of lithium chloride, and about 31.53 g of potassium chloride using a mortar and pestle. An inhibitor salt mixture was prepared by mixing and grinding the inhibitor mixture with the molten chloride salt mixture, using a mortar and pestle. The inhibitor salt mixture was transferred into an alumina tube, the alumina tube with the inhibitor salt mixture was heated to about 700° C. in a furnace purged with inert argon (Ar) gas for the duration of the heat treatment. After the inhibitor salt mixture was molten, the steel rod was immersed and rotated in the molten inhibitor salt mixture at about 10 revolutions per minute (rpm) for about 200 hours; the rotation of the steel rod was stopped during the cool down process when the inhibitor salt mixture reached its freezing temperature.

The heat treated steel rod was extracted from the molten salt mixture at about 400° C. under a flowing argon gas environment to prevent corrosion of the steel rod. The portion of the steel rod that was immersed in the molten inhibitor salt mixture metal rod was cut off, cleaned using water and a brush, and stored in desiccator for further analysis. Optical microscopy of the portion of the steel rod that was cut off showed a cubic, crystalline lanthanum ferrite ($LaFeO_3$) layer indicative of a perovskite layer covering and bonded to the surface of the steel rod. The thickness of the perovskite layer bonded to the surface of the steel rod varied from about 15-30 microns.

Example 8

This example illustrates the formation of a perovskite layer on the surface of a 347H grade stainless steel rod, with a dimension of about ¼ inch diameter and 24 inches in length, hereinafter steel rod, where the molten chloride salt mixture applied to the surface of the steel rod was a ternary eutectic mixture. An inhibitor mixture was prepared by mixing and grinding about 5.70 g of lanthanum oxide and about 0.15 g of sodium peroxide using a mortar and pestle. A molten chloride salt mixture was prepared by mixing and grinding 20.20 g of lithium chloride (LiCl), about 5.90 g of sodium chloride (NaCl), and about 28.27 g of potassium chloride (KCl) using a mortar and pestle. An inhibitor salt mixture was prepared by mixing and grinding the inhibitor mixture with the molten chloride salt mixture, using a mortar and pestle. The inhibitor salt mixture was placed in a ceramic crucible and melted at about 335° C. in a furnace and maintained at that temperature for about 2 hours. The inhibitor salt mixture was cooled and crushed to a fine powder. About 60 g of the inhibitor salt mixture was transferred into an alumina tube; the alumina tube with the inhibitor salt mixture was heated to about 750° C. in a furnace purged with inert nitrogen for the entire duration of the heat treatment. After the inhibitor salt mixture is molten, the steel rod was immersed and rotated in the molten inhibitor salt mixture at about 20 revolutions per minute (rpm) for about 150 hours. At the end of the heat treatment process the temperature in the furnace was lowered and the rotation of the steel rod was stopped when the inhibitor salt mixture reached its freezing temperature.

Following the cooling and cleaning of the steel rod, the part of the steel rod immersed in the inhibitor salt mixture showed a shiny, crystalline surface of the perovskite layer. Further analysis of the steel rod using SEM showed the surface of the steel rod covered with a continuous lanthanum ferrite ($LaFeO_3$) layer. EDS analysis on the steel rod confirmed that the constituents of the perovskite layer are lanthanum, oxygen and iron. The perovskite layer was firmly bonded to the surface of the steel rod. The thickness of the perovskite layer bonded to the surface of the steel rod varied from about 1-20 microns.

Example 9

This example illustrates the formation and bonding of a perovskite layer on the surface of 304 grade stainless steel coupons with a dimension of about ½ inch by ½ inch by ¹⁄₁₆ inch, each, hereafter steel coupon, where the molten chloride salt mixture applied to the surface of the coupon was a ternary eutectic mixture. An inhibitor mixture was prepared by mixing and grinding about 0.99 g of lanthanum oxide ($La_2O_3$), and about 0.03 g of potassium peroxide ($K_2O$) using a mortar and pestle. A molten chloride salt mixture was prepared by nixing and grinding individually dried 6.99 g of lithium chloride (LiCl), 10.03 g of potassium chloride (KCl) and 1.97 g of sodium chloride (NaCl). An inhibitor salt mixture was prepared by mixing and grinding the inhibitor mixture with the molten chloride salt mixture, using a mortar and pestle. Nine metal coupons were polished with SiC paper to about 1200 grit. The polished steel coupons were weighed before testing. Three polished steel coupons were placed in each of the three alumina crucibles, and about 6-7 g of the inhibitor salt mixture was added to each crucible to cover the polished steel coupons. Each crucible was thereafter covered with a ceramic lid. The crucibles with the steel coupons were heat treated at about 720° C. for about 100 hours in a furnace purged with inert argon (Ar) gas during the duration of the heat treatment. At the end of the heat treatment, the inhibitor salt mixture was removed off the steel coupons with water and a plastic bristle brush. No loss of the perovskite coating formed and bonded to the surface of the steel coupons was observed during this cleaning. The nine steel coupons were weighed again after they were cleaned. Each of the steel coupons showed a weight gain per unit area of the coupon due to the perovskite layer that formed and bonded to the surface of the steel coupons.

Separately, a molten chloride salt mixture was prepared by crushing and mixing individually dried about 6.99 g of lithium chloride (LiCl), 10.03 g of potassium chloride (KCl), and 1.97 g of sodium chloride (NaCl) salts. Nine steel coupons were polished to about 1200 grit. The molten chloride salt mixture was not mixed with an inhibitor mixture. Three steel coupons with a sufficient amount of the molten chloride salt mixture to cover the steel coupons were placed in each of the three crucibles, and the crucibles were heat treated in the furnace for about 100 hours at about 720° C., under an inert argon gas environment for the entire duration of the heat treatment. At the end of the heat treatment, the inhibitor mixture was removed from the steel coupons and the steel coupons were cleaned with water and a plastic bristle brush. During cleaning, brown corrosion product flakes that formed on the surface of the steel coupons were easily dislodged from the surface of the steel coupons. The nine steel coupons were weighed again after cleaning. Each of the nine steel coupons showed a weight loss per unit area of the coupon due to the corrosion product formed on the surface of the steel coupon that was dislodged from the surface of the steel coupons during cleaning.

Example 10

This example illustrates the formation and bonding of a perovskite layer on the surface of 316 grade stainless steel metal pieces with a steel piece dimension of about ½ inch by ½ inch by ¹⁄₁₆ inch, hereafter metal pieces, where the molten chloride salt mixture applied to the surface of the metal piece was a binary eutectic mixture. An inhibitor mixture was prepared by mixing and grinding about 1.01 g of cerium ferrite ($Ce_2O_3$), and about 0.027 g of sodium peroxide ($Na_2O_2$) using a mortar and pestle. A molten chloride salt mixture was prepared by mixing and grinding individually dried 8.44 g of lithium chloride (LiCl), and 10.44 g of potassium chloride (KCl). An inhibitor salt mixture was prepared by mixing and grinding the inhibitor mixture with the molten chloride salt mixture, using a mortar and pestle.

The inhibitor salt mixture was transferred to a silica crucible and melted at about 355° C. The inhibitor salt mixture was maintained at 355° C. for 2 hours and then the mixture was cooled, crushed and ground to create a homogenous inhibitor salt mixture. The inhibitor salt mixture and the steel metal pieces were transferred to an alumina crucible and covered with a ceramic lid. The alumina crucible with the metal pieces were thermal cycled between about 450° C. and 720° C., for about 8 hours at each temperature for four cycles in a furnace purged under a flowing inert nitrogen environment. At the end of the heat treatment, the inhibitor salt mixture was removed from the surface of the metal pieces using water and a plastic brush.

Cross-sections of the metal pieces were prepared using Focused Ion Beam (FIB) technique. A platinum layer was deposited in-situ on the surface of the metal pieces when cross-sections of the steel pieces using FIB were prepared to protect the top surface layers of the metal pieces from being milled away. SEM and EDS of the cross-sectional layer shows the continuous, adherent perovskite layer comprising cerium ferrite on the surface of the metal pieces. The thickness of the perovskite layer bonded to the surface of the metal pieces varied from about 10-30 microns.

The foregoing examples have been provided merely for explanation and are in no way to be construed as limiting of the method disclosed herein. While the method has been described with reference to various embodiments, it is understood that the words, which have been used herein, are words of description and illustration, rather than words of limitation. Furthermore, although the method has been described herein with reference to particular means, materials, and embodiments, the method is not intended to be limited to the particulars disclosed herein; rather, the method extends to all functionally equivalent structures, methods and uses, such as are within the scope of the appended claims. While multiple embodiments are disclosed, it will be understood by those skilled in the art, having the benefit of the teachings of this specification, that the method disclosed herein is capable of modifications and other embodiments may be effected and changes may be made thereto, without departing from the scope and spirit of the method disclosed herein.

I claim:

1. A molten salt inhibitor mixture for application on a steel component core, wherein said molten salt inhibitor mixture comprises:
    an inhibitor mixture comprising:
        about 0.5% to about 5% by weight of a rare-earth oxide, based on weight of said inhibitor mixture; and
        about 0.1% to about 1% by weight of an oxidizer, based on said weight of said inhibitor mixture;
    a molten chloride salt mixture comprising a ternary eutectic mixture comprising lithium chloride in about 15% to about 35% by weight of said ternary eutectic mixture, potassium chloride in about 40% to about 60% by weight of said ternary eutectic mixture, and sodium chloride in about 5% to about 10% by weight of said ternary eutectic mixture;
    wherein melting point of said molten chloride salt mixture is about 300° C. to and about 400° C.;
    wherein said steel component core comprises one of a 316 grade stainless steel alloy, a 304 grade stainless steel alloy, a 309 grade stainless steel alloy, a 321 grade stainless steel alloy, and a 347H grade stainless steel;
    wherein said molten salt inhibitor mixture forms in-situ, a substantially continuous layer of $XFeO_3$ corrosion resistant perovskite on said steel component core, in a melt at a temperature between 400° C. to about 900° C., wherein X in said XFeO3 is one element selected from lanthanum, cerium, gadolinium and dysprosium.

2. The molten salt inhibitor mixture of claim 1, wherein said rare-earth oxide comprises oxides of lanthanum, oxides of cerium, oxides of gadolinium, oxides of dysprosium, and any combination thereof, and wherein said oxidizer comprises peroxides of sodium, peroxides of potassium, peroxides of magnesium, and any combination thereof.

3. The molten salt inhibitor mixture of claim 1, wherein said oxidizer in said inhibitor mixture facilitates formation of a corrosion resistant perovskite layer on a surface of said steel component.

4. The molten salt inhibitor mixture of claim 1, wherein said corrosion resistant perovskite layer covers substantially the entire surface of said steel component core.

5. The molten salt inhibitor mixture of claim 1, wherein said molten salt inhibitor mixture is configured for use as a heat transfer fluid and a thermal energy storage medium.

* * * * *